A. PIRCH.
COMBINED DITCHING, GANG AND SHOVEL PLOW.

No. 191,880. Patented June 12, 1877.

Witnesses:
A. H. Evans.
Geo. H. Evans.

Inventor:
August Pirch,
by James H. Mandeville
his Attorney.

UNITED STATES PATENT OFFICE.

AUGUST PIRCH, OF DENVER, COLORADO.

IMPROVEMENT IN COMBINED DITCHING, GANG, AND SHOVEL PLOW.

Specification forming part of Letters Patent No. 191,880, dated June 12, 1877; application filed May 21, 1877.

*To all whom it may concern:*

Be it known that I, AUGUST PIRCH, of the city of Denver, in the State of Colorado, have invented new and useful Improvements in Sulky, Ditching, and Gang Plows, fully set forth in the following specification:

I combine two right and two left hand adjustable plows to be used in the construction of ditches, so that by the removal of the right or left hand plows the others may be shifted and used as right or left hand gang-plows, as the nature of the ground may require. I employ an adjustable land-side to compensate for the wear of the plowshares; an adjustable scraper for removing the earth thrown up by the front plows out of the way of the rear plows; and an adjustable axle to raise and lower the wheel, so as to control the plow on uneven ground.

My invention is especially intended for the construction of surface-ditches, for reclaiming desert lands by conducting water upon them, and for the irrigation of lands generally.

Figure 1:
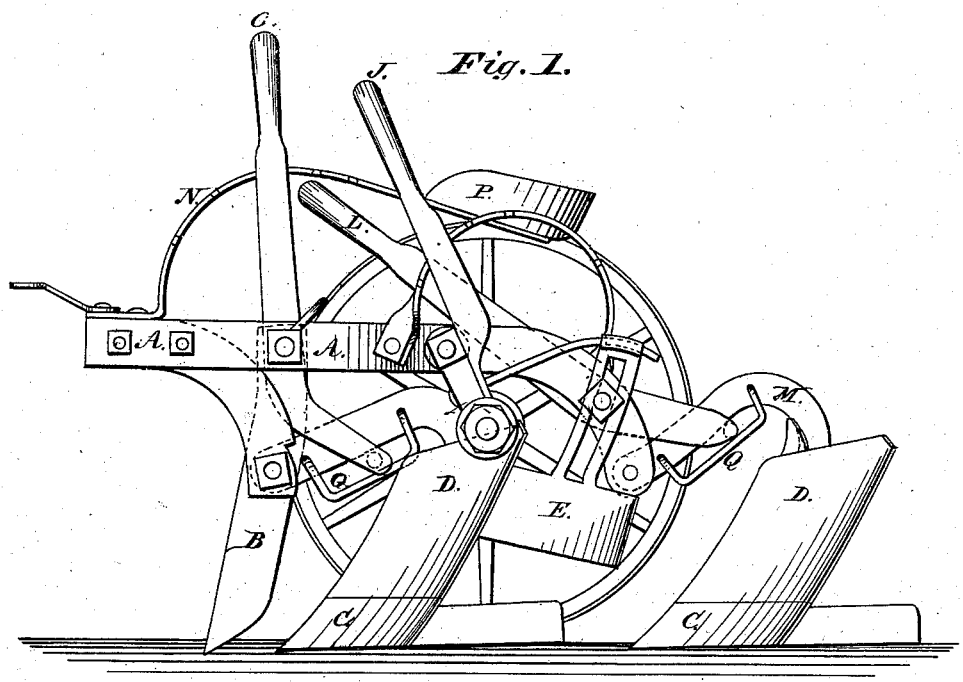
Figure 2:
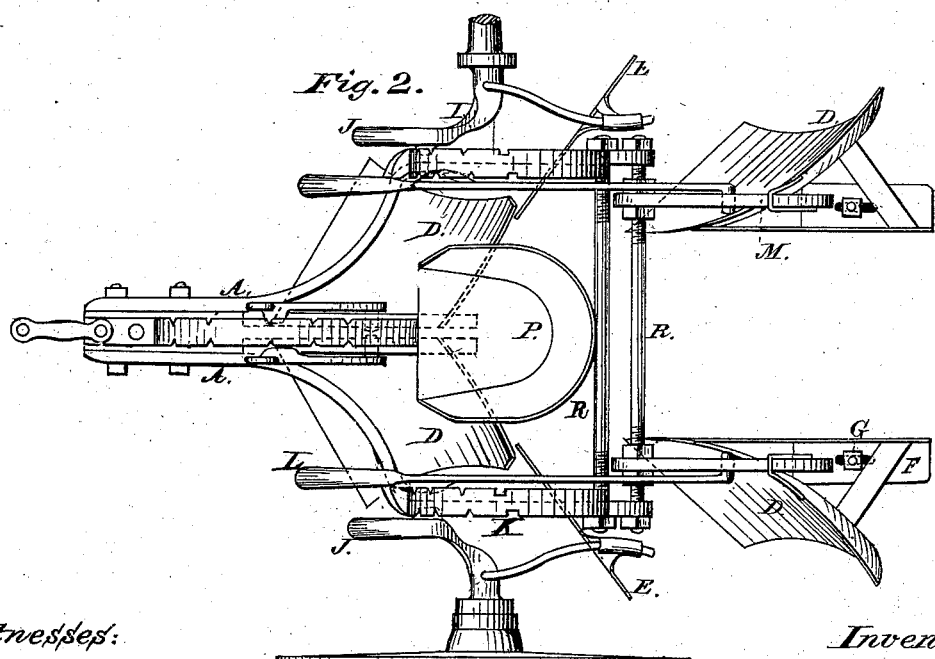

Figure 1 is a side view of the invention, and Fig. 2 is a plan view of the same, the draft-tongue being removed.

A represents the frame; B, the colter; C, the plowshares; D, the mold-boards; E, the adjustable scrapers; F, the adjustable land-side, to be set backward as the share wears away; G, the screw-bolt for adjusting the land-side. When adjusted, the land-side may be secured and kept steady by a wooden shoe. I represents short axles, to carry the wheels, and adjustable by levers J, to enable the plow to be run successfully on a side-hill or upon uneven ground. An arm from said lever moves the scrapers E automatically with the crank-axle. L, lever for raising and lowering the rear plows; K, bent double-ratchet for holding in place the levers J and L; M, beam for rear plow; N, seat-spring and double-ratchet for holding levers; O, levers for raising the front plows; and P, driver's seat.

The levers for operating the plows all have terminal projections, which move in guides Q. R R are rods for supporting the rear plows, and are provided with screw-threads, so that the plows may be shifted to the opposite side in forming a gang or the distance changed between furrows. The levers and the plows are all pivoted to the frame, and the colter and scrapers are adjustably bolted to the frame.

The machine as a whole is to be used as a ditch-plow; by the removal of the rear plows, as a shovel-plow; and by the removal of the plows on either side, and the shifting of the rear remaining one to the opposite side, as a gang-plow. It is intended that the weight of the tongue will balance the plow.

I claim—

1. In a sulky-plow adapted for ditching purposes, the combination and arrangement, with the frame A, of the plows D, each plow being separately adjustable, the adjustable scrapers E, and the levers L O, for raising the plows, substantially as described.

2. In combination with the frame A, the cross-rods R R, arranged to support the rear plows and their lifting-levers, and adjust the same laterally thereon, so that by a removal of the front and rear plows on one side the remaining rear plow can be shifted, so as to adapt the machine for a gang-plow.

In testimony that I claim the foregoing I have hereunto set my hand this 21st day of September, 1876.

AUGUST PIRCH.

Witnesses:
HARRY Y. ANDERSON,
W. C. ANDERSON.